United States Patent [19]

Puckette et al.

[11] Patent Number: 5,414,420

[45] Date of Patent: May 9, 1995

[54] SWITCH INTERCONNECT FOR POSITION ENCODER SYSTEM

[75] Inventors: Robert B. E. Puckette; Timothy J. Jondrow, both of Corvallis, Oreg.

[73] Assignee: Hewlett-Packard Corporation, Palo Alto, Calif.

[21] Appl. No.: 919,483

[22] Filed: Jul. 24, 1992

Related U.S. Application Data

[63] Continuation-in-part of Ser. No. 856,436, Mar. 23, 1992.

[51] Int. Cl.⁶ .......................................... H03K 17/94
[52] U.S. Cl. ............................................ 341/20; 341/22; 341/26; 341/33; 200/600; 361/288
[58] Field of Search ............... 341/22, 20, 26, 33; 340/870.37; 345/157–158, 160–161, 163, 168–169; 364/188–190, 708.1, 709.01, 709.08, 709.09, 709.11, 709.12, 709.13; 200/600; 361/288

[56] References Cited

U.S. PATENT DOCUMENTS

| | | |
|---|---|---|
| 3,068,457 | 12/1962 | Nevius . |
| 3,125,716 | 3/1964 | Machlis . |
| 3,198,937 | 8/1965 | Wooster . |
| 3,222,591 | 12/1965 | Mynall . |
| 3,702,467 | 11/1972 | Melnyk ............................ 340/870.37 |
| 3,723,866 | 3/1973 | Michaud et al. ..................... 324/662 |
| 3,857,092 | 12/1974 | Meyer ................................. 324/662 |
| 3,873,916 | 3/1975 | Sterki ................................. 324/725 |
| 3,938,113 | 2/1976 | Dobson et al. ................ 340/870.37 |
| 3,961,318 | 6/1976 | Farrand et al. ..................... 324/660 |
| 4,182,981 | 1/1980 | Shum et al. ........................ 324/662 |
| 4,217,542 | 8/1980 | Abbe et al. ......................... 324/662 |
| 4,404,560 | 9/1983 | Williams, Jr. ....................... 324/660 |
| 4,420,754 | 12/1983 | Andermo ....................... 340/870.37 |
| 4,453,316 | 6/1984 | Marveggio ........................ 33/199 R |
| 4,459,702 | 7/1984 | Medwin ................................ 377/24 |
| 4,581,676 | 4/1986 | Baxter et al. ..................... 361/283.4 |
| 4,586,260 | 5/1986 | Baxter et al. ........................ 33/706 |
| 4,654,524 | 3/1987 | Kita ................................ 250/231.14 |
| 4,654,581 | 3/1987 | Neukermans et al. ............... 324/725 |
| 4,680,577 | 7/1987 | Straayer et al. ..................... 345/160 |
| 4,743,838 | 5/1988 | Eckerle ................................ 324/660 |
| 4,743,902 | 5/1988 | Andermo ....................... 340/870.37 |
| 4,782,327 | 11/1988 | Kley et al. ............................. 341/20 |
| 4,798,004 | 1/1989 | Suzuki .................................. 33/793 |
| 4,823,364 | 4/1989 | Herzog ................................. 375/36 |
| 4,857,828 | 8/1989 | Celine ............................. 340/825.37 |
| 4,896,554 | 1/1990 | Culver ............................. 74/471 X |
| 4,920,342 | 4/1990 | Gratke ................................. 341/33 |
| 4,935,728 | 6/1990 | Kley .................................. 345/161 |
| 4,959,615 | 9/1990 | Andermo ....................... 340/870.37 |
| 5,049,863 | 9/1991 | Oka ................................... 345/163 |
| 5,126,955 | 6/1992 | Tomoda ............................. 345/163 |
| 5,172,485 | 12/1992 | Gerhard et al. ...................... 33/706 |
| 5,270,710 | 12/1993 | Gaultier et al. ....................... 341/33 |

FOREIGN PATENT DOCUMENTS

| | | |
|---|---|---|
| 0404975A1 | 1/1991 | European Pat. Off. . |
| 0404980A1 | 6/1991 | European Pat. Off. . |
| 0435429A1 | 7/1991 | European Pat. Off. . |
| 2017188 | 8/1971 | Germany . |
| 2150928 | 5/1972 | Germany . |
| 2217183 | 12/1972 | Germany . |
| 2246660 | 5/1973 | Germany . |
| 2254567 | 5/1973 | Germany . |
| 2218824 | 10/1973 | Germany . |
| 2853142 | 5/1988 | Germany . |
| 59-214712A | 4/1984 | Japan . |
| 1523943 | 9/1978 | United Kingdom . |
| 2118720 | 11/1983 | United Kingdom . |
| 2139359 | 11/1984 | United Kingdom . |
| 2266360 | 10/1993 | United Kingdom . |

OTHER PUBLICATIONS

1-Page article entitled "A Different Kind of Animal", ALTRA, circa Jan. 1992.

2-page brochure entitled "Push–n–Point" Home Row, Inc.; Apr., 1991.

(List continued on next page.)

Primary Examiner—Jeffery A. Hopsass
Assistant Examiner—Andrew Hill

[57] ABSTRACT

Information representing the state of switches carried on a pointing device handle is carried to an associated computer via a capacitive coupling technique.

12 Claims, 4 Drawing Sheets

OTHER PUBLICATIONS

"The Mouse Ran Under The 'J'", Electronic Engineering Times; Jul. 2, 1990.

"Thumb-actuated, Cursor-positioning Devices Provides 2-D Axis Control in a Small Space" ALPS Elcetric U.S.A., Product Update, EDN, Feb., 1989.

News Release by ALPS Electric (USA), Inc. entitled "ALPS Electric Introduces New Cursor Control Device for Laptops," released Nov. 14, 1988—2 pages.

Mitutoyo "Digimatic Caliper" instruction sheet; Series 500, 550, 551; Manual No. 2035, circa Jan. 1992.

Service Manual, HP9111A Graphics Tablet, Section VI, 27 pages, Hewlett Packard Co., circa Jan. 1992.

"Development of A Capacitive Measuring System for Workshop Measuring Instruments"; Fred V. Fowler Co. Inc., Oct. 1985, 8 pages.

"Field Mice, Different, Yes. Better, Maybe"; PC Magazine, Oct. 15, 1991, pp. 111-133.

"Isn't It Time We Get Serious About Laptop Pointing Devices?", Article by John Dickerson; Apr. 1991, p. 46.

"Input Alternatives —Howand and Why to Choose a Better Pointing Device" by Franklin N. Tessler; Macworld, Jun. 1992; pp. 154-159.

"Display-Selection Techniques for Text Manipulation" by William K. English, Douglas C. Engelbart & Melvyn L. Berman; IEEE Transactions on Human Factors in Electronics; Mar. 1967.

"Fingertip Mouse Control Without Leaving Your Keyboard"; May 1991; PC World, p. 103.

"Fresh Ways to TALK to Your Computer", Design News, Feb. 25, 1991, pp. 83-86.

"Touchman—The World's First Stationary Mouse" Agiler, 5-page brochure; Sep. 14, 1990.

"Notebooks Need Portable Pointer—Increasing Importance of Graphical Interface Urges Portables to Comply"; Infoworld; Jun. 17, 1991, p. 21.

"The Twiddler" Handykey Corporation brochure, copyright Jan. 1991.

Pointing Device Specification Sheets, 3 pages—Jun. 3, 1991.

Two page specification sheet, Fujitsu Ltd., Pivoting Dome Pointing Device Jul. 16, 1991.

Micro Track Ball; ALPS Electric Co. Ltd.; 1 page specification, circa Jan. 1992.

Electronics Week, Jul. 23, 1984, p. 26, "'Puck Pointer' Combines Functions of Mouse and Joystick in Number-Pad Sized Package".

PC Magazine, Aug. 1987, pp. 95-101, 105-106, 117-120, 159-161, 183-185, 199-200.

"Lightgate Input Device Offers More Intuitive, Precise Interface" Info-World, Dec. 14, 1987, 2 pages.

Flyer, "Das SYNVAC—Mess-System," 4 pp., circa 1972, Germany.

Report of Commissariat à l'Energie Atomique, "Capteurs Capacitifs de Deplacements, Lineaires et Angulaires," France, 1975, 10 pp.

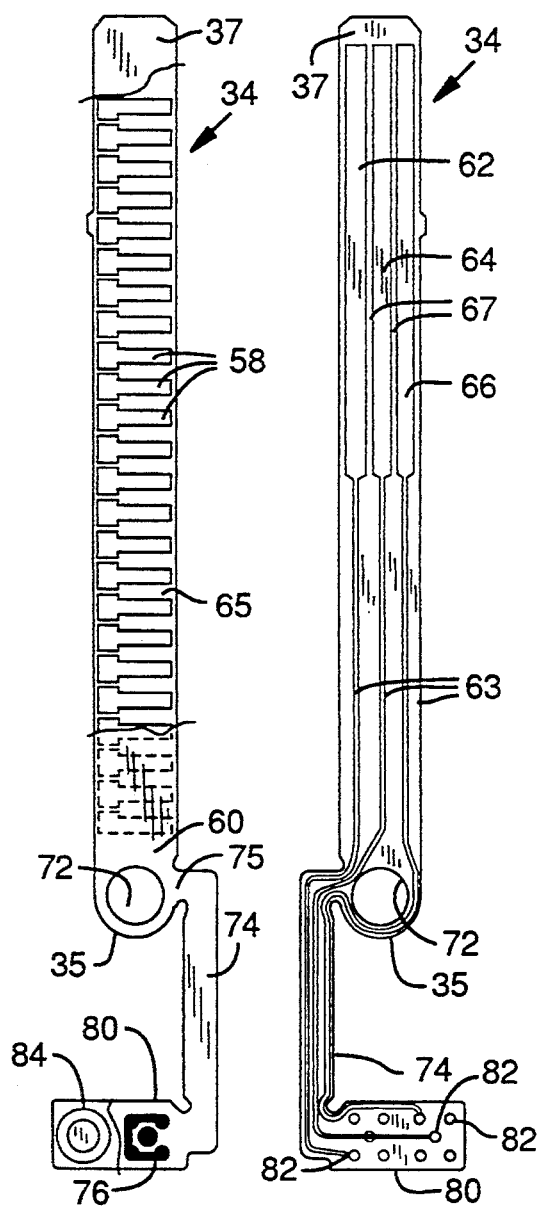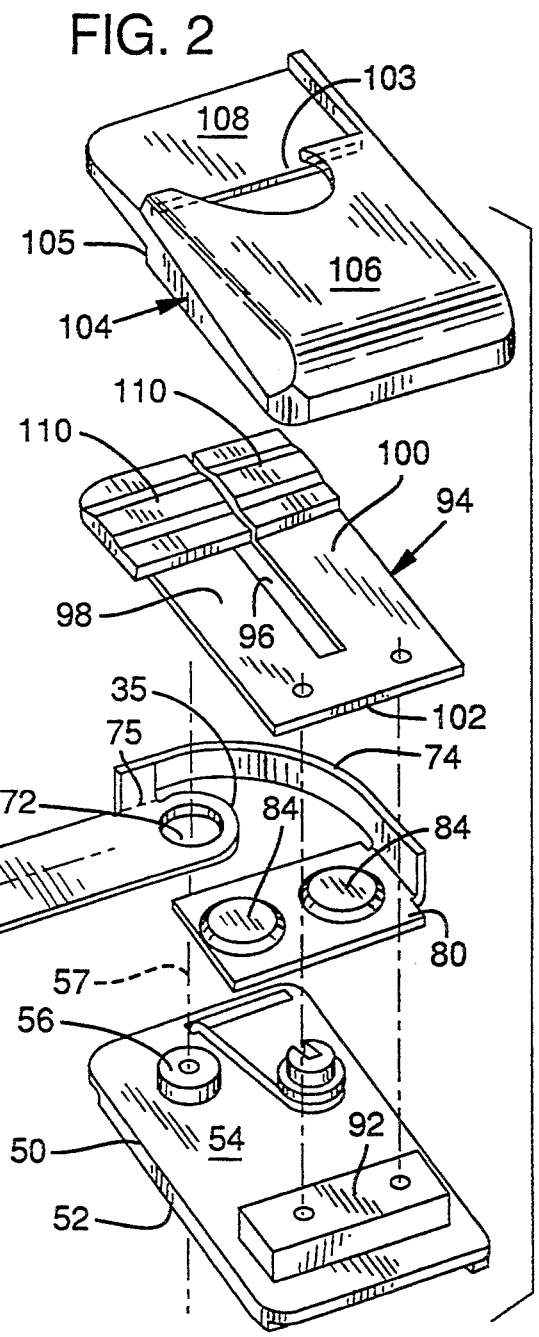

5,414,420

SWITCH INTERCONNECT FOR POSITION ENCODER SYSTEM

This application is a continuation-in-part of U.S. patent application Ser. No. 07/856,436, filed Mar. 23, 1992, allowed Jan. 10, 1995.

TECHNICAL FIELD

The invention is related to interconnection of peripheral devices, such as pointing devices, with a computer, and is more particularly related to capacitively interconnecting peripheral devices to a computer.

BACKGROUND INFORMATION

A position encoder system is described in copending U.S. patent application Ser. No. 07/856,436, entitled "Position Encoder System," which is herein incorporated by reference. The position encoder system described in that application is embodied as an input device for a "notebook" type computer. The input device includes a small handle that is manipulated by the user to control, for example, the position of a cursor on the computer screen. The handle includes two push-button type switches that can be depressed to activate any of a number of functions, such as pulling down a computer program menu.

The handle is carried on the end of a somewhat rigid, elongated link. The link is connected to a carrier that is inside of the computer. The link slides in the carrier, and the carrier rotates, thereby allowing motion of the link in two dimensions. The link's sliding motion and the carrier's rotation are measured to provide data to track the handle's position, which can be correlated to the cursor position.

The preferred technique for measuring the link sliding motion and the rotational motion of the carrier includes a pattern of conductors printed on one side of the link to move with the link relative to an adjacent conductive pattern that is mounted to the carrier. The pattern on the carrier is driven with a series of moving wave signals that are capacitively coupled to the pattern on the link, those signals being returned (again, via capacitive coupling) to the carrier. The returned signals are phase modulated as a result of movement of the link relative to the carrier. The phase-modulated signals are detected and processed to yield digital information indicative of the motion of the link. No direct conductive path between the link and the computer is necessary to provide the motion information.

In the above-mentioned position encoder system, information representing the state of the switches on the handle is conveyed to the computer through conductive paths. The conductive paths may take the form of either wires or sliding contacts connected between the link and carrier. Both forms of conductive paths, however, pose problems. If wires are used to connect the link to the computer, a considerable volume of interior space will be consumed to house the slack wires needed to permit movement of the link in its carrier inside the computer. Also, the wires must be very flexible and arranged to avoid interference with the free motion of the handle.

Sliding contacts also require a significant amount of the interior space of the computer and may interfere with the free movement of the handle due to the friction necessarily applied by the contacts to the sliding link. Such sliding contacts are subject to considerable wear. A reliable sliding contact is difficult to manufacture and maintain because dirt and other foreign matter may enter the contact area.

SUMMARY OF THE INVENTION

In accordance with the present invention, the state information of push-button switches carried on the handle of a pointing device is conveyed to the computer through capacitive coupling, thereby eliminating the above-mentioned problems associated with conveyance of the switch state information through wires or sliding contacts.

In a preferred embodiment, the capacitive coupling of the switch state information permits easy removal of the handle assembly from the computer. Accordingly, a worn or damaged link can be replaced by the user without the need for professional computer repair service. The capacitive coupling technique is not easily affected by, nor does it cause, wearing of the link.

Capacitive coupling of switch state information also has the advantage of preventing damage to the computer from electro-static discharge. With conductive paths such as wires or sliding contacts, static electric charges built up on the user could discharge into and damage the computer. Since there is no such conductive path from the link to the computer with the present invention, static electric charges are prevented from discharging into the computer.

Electro-magnetic emissions may also be reduced since, with capacitive coupling, conductors within the link that could act as an antenna are not conductively connected to the electronics in the computer.

Additional features and advantages of the invention will be made apparent from the following description of the preferred embodiment, which proceeds with reference to the accompanying drawings.

DESCRIPTION OF THE DRAWINGS

FIG. 2 is a perspective exploded view of the handle part of the encoder system.

FIG. 3 is a top view of a link for connecting the handle and computer, illustrating the link prior to assembly.

FIG. 4 is a bottom view of the link.

DETAILED DESCRIPTION OF THE PREFERRED EMBODIMENT

Figure 1:
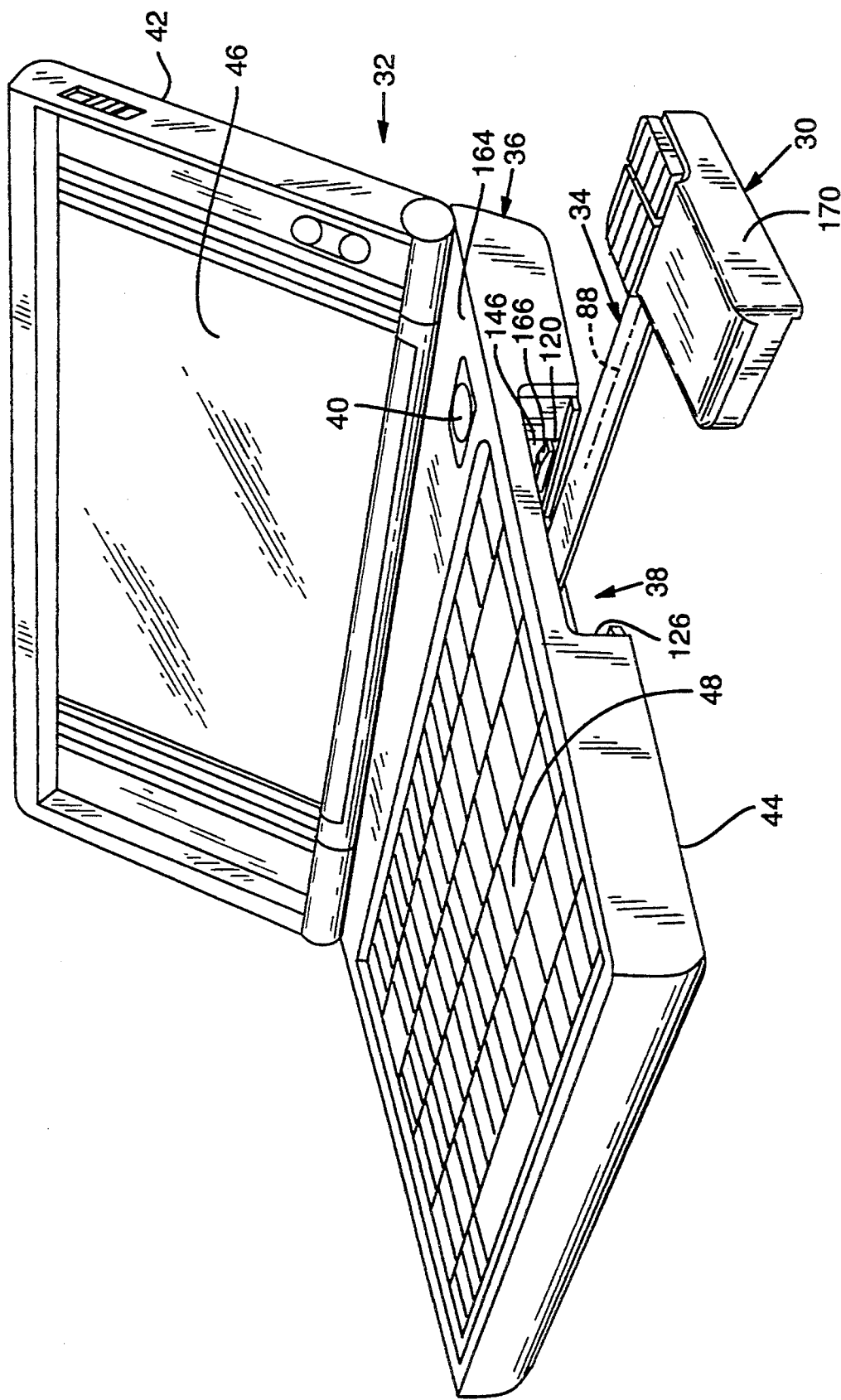
FIG. 1 is a perspective view of a compact, notebook-type computer that includes a position encoder system in the form of a pointing device with which the switch interconnect of the present invention may be employed.

FIG. 1 shows a position encoder system used as an input device for a portable computer, to which system the present invention is adaptable. The system includes a movable handle 30 that is connected to a computer 32 by a link 34. FIG. 1 shows the handle 30 in an extended position. The computer housing 36 includes a stowage compartment 38 into which the handle 30 may be inserted and stowed when not in use. Whenever an eject button 40 is depressed by the user, the handle 30 is ejected from the stowage compartment 38 for manipulation by the user.

Movement of the handle 30 is sensed by a sensing system, which encodes the motion of the handle 30 and provides to the computer 32 digital information representative of the position of the handle. This information is made available to the computer for conventional applications, such as controlling the movement of a cursor on the computer display screen.

Turning first to the particulars of the handle mechanisms associated with the position encoder system, and with reference to FIGS. 1 and 2, the computer 32 may be any one of a variety of types, such as the notebook-type shown in FIG. 1. The computer 32 is compact and portable, and can be powered by battery. The housing 36 of the computer is characterized by a top 42 that is hinged to a base 44. The top 42 includes a display screen 46. The base 44 has mounted to it a keyboard 48 that serves as the primary input device for the computer. The microprocessor and memory components required for the computer 32 are housed in the base 44.

The link 34 is connected to move with the handle 30. The encoder system determines motion of the handle 30 by sensing the corresponding motion of the link 34 as the link moves relative to sensing components that are contained within the base 44 as described below.

As shown in FIG. 2, the handle includes a substantially flat, plastic bottom 50 that is generally rectangular as viewed from above. The handle 30 is sized so that the undersurface 52 of the bottom 50 is generally coplanar with the bottom surface of the computer base 44. The undersurface 52 of the handle bottom 50 comprises, or has attached to it, low-friction material, such as that manufactured under the trademark TEFLON, by DuPont, to permit the extended handle 30 to easily slide over the top of a work surface that supports the computer 32.

The upper surface 54 of the handle bottom 50 includes an upwardly protruding pivot post 56 to which the outer end 35 of the link 34 is pivotally attached. The handle 30, therefore, is pivotable about the central axis 57 of the post 56.

The link 34 (FIGS. 2-5) generally comprises an elongated member formed of an injection-molded acetal core having about 0.56 mm thickness. Adhered to the upper surface of the core is a 0.051 mm thick polyimide film 65, such as that manufactured by DuPont under the trademark Kapton, that carries on its upper surface an electrically conductive, patterned layer, hereafter referred to as the R mixer pattern 58. The R mixer pattern 58 is located just beneath a thin, opaque plastic top layer 60 that is adhered to the film 65.

In a preferred embodiment, the film 65 and R mixer pattern 58 have a combined thickness of about 165 $\mu$m, and the plastic top layer 60 is about 38 $\mu$m thick. The R mixer pattern 58 (FIG. 3) is configured as a plurality of adjacent bars. The movement of this R mixer pattern 58 (as the user moves the handle 30 and attached link 34) is detected by the sensing system that is described in detail in U.S. patent application Ser. No. 07/856,436.

Three adjacent, electrically conductive strips 62, 64, 66 are applied to the underside of the link (FIG. 4). Specifically, a 0,051 mm thick polyimide film 67, such as that manufactured by DuPont under the trademark Kapton, is laminated to the underside of the link. The film carries copper traces that define the conductive strips 62, 64, 66.

Each strip 62, 64, 66 extends along the length of the link 34 from the inner end 37 of the link to a location near the midpoint of the link, whence the strips are substantially narrowed and spaced apart and continue as patterns 63 extending to the outer end 35 of the link 34.

The outer end 35 of the link 34 includes an aperture 72 through which fits the handle pivot post 56 mentioned above (FIG. 2). The outer end 35 of the link also includes a generally elongated extension piece 74. That piece 74 includes an extension of the pattern 63 and film adhered to a corresponding extension of the core of link 34. The link extension piece 74 terminates in a generally rectangular switch piece 80. The upper surface of the switch piece 80 (FIG. 3) includes two exposed contact patterns 76 on each of which is mounted a normally-open snap-dome type switch 84. Conductors 82 extend between those patterns 76 and the three-conductor pattern 63 on the underside of the switch piece 80 (FIG. 4). In a preferred embodiment, two such switches 84 and the contact patterns 76 are arranged so that either or both switches can be closed.

Referring to FIG. 2, the handle 30 includes a top case 104 that mounts to the handle bottom 50 and encases the link outer end 35, extension piece 74, and switches 84. The outer end 35 of the link 34 extends through a slot 105 that is formed in the front and inner sidewall of the handle top case 104. More particularly, the junction 75 of the extension piece 74 and outer end 35 of the link 34 is the location where the extension piece 74 is bent upwardly (FIG. 2) to an orientation generally perpendicular to the plane of the link 34. Between that junction 75 and the switch piece 80, the extension piece 74 is bent into a curved shape. The switch piece 80 is bent at the extension 74 so that the switches 84 face upwardly, and the underside of the switch piece 80 is fastened to the upper surface 54 of the handle bottom 50.

Rearward (i.e., toward the lower right side of FIG. 2) of the switch piece 80 there is mounted to the handle bottom 50 a fulcrum block 92 to which is attached a switch lever mechanism 94. The switch lever mechanism 94 comprises a generally flat rectangular plate having an elongated slot 96 formed in it to extend from the forward end of the plate to a location near the rearward end 102 of the mechanism 94, thereby providing two cantilevered lever arms 98, 100 that are joined at the rearward end 102. The rearward end 102 is fastened to the fulcrum block 92.

The upper surface 106 of the handle case 104 is recessed near the forward end of the case. A slit 103 is formed in the vertical shoulder that extends between the recessed surface 108 and the top surface 106 of the handle case 104. The free ends of the lever arms 98, 100 extend through the slit 103. The lever arms 98, 100 of the switch lever mechanism rest upon the tops of the snap-dome switches 84, which switches are normally in the open position. The free ends of the lever arms 98, 100 are suspended a short distance above the recessed surface 108 in the handle case 104 and are equipped with finger grips 110. The snap-dome switches 84 are closed when the user presses a finger grip 110, hence bending the corresponding lever arm 98, 100 about the fulcrum block 92 to depress the underlying switches 84. The recessed surface 108 acts as a stop to limit downward motion of the lever arms 98, 100.

Figure 5:
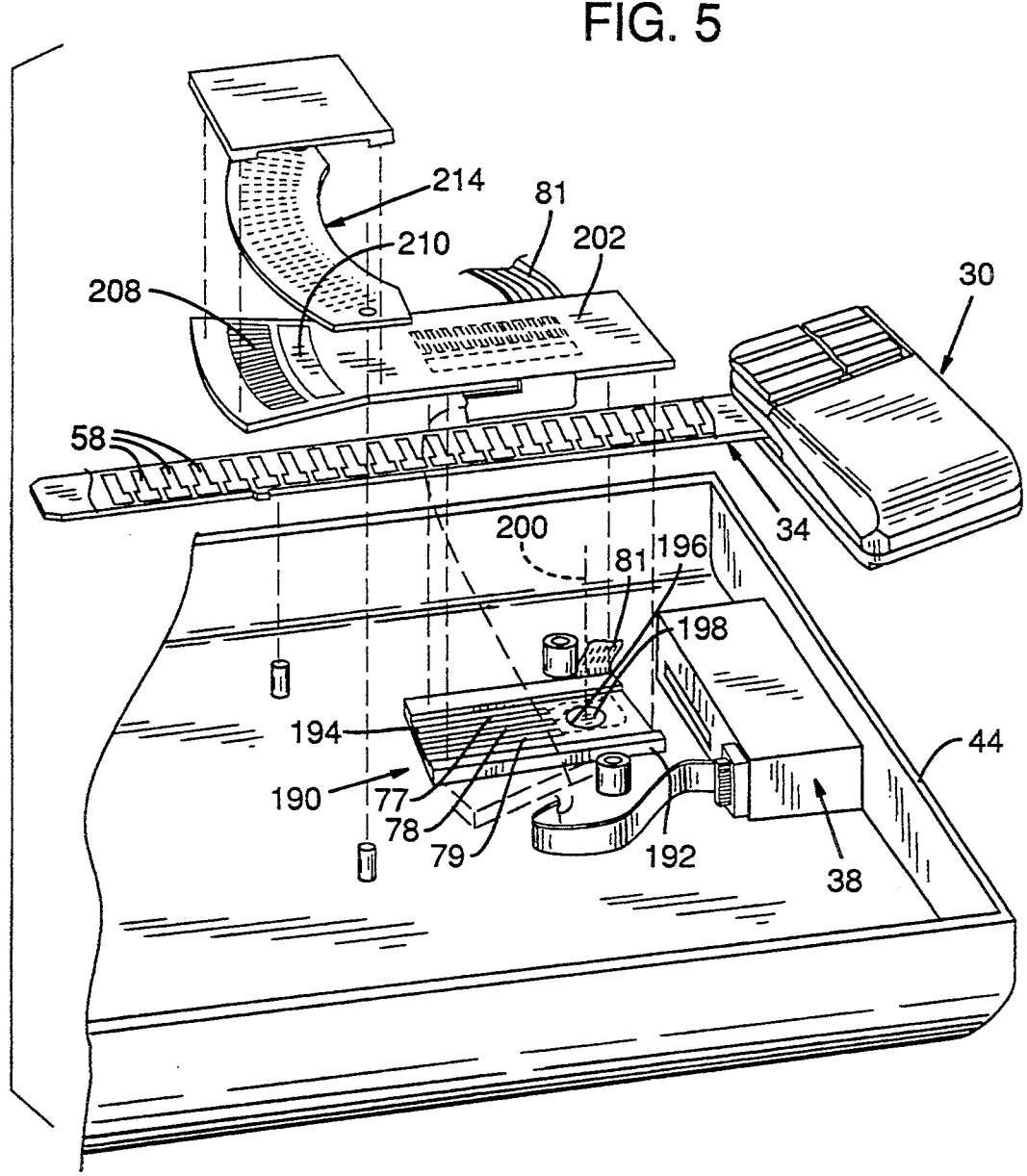
FIG. 5 is a perspective exploded view of the position sensing components of the encoder system.

With reference to FIG. 5, the link 34 is constrained to movement within a single plane and in dimensions that correspond to a polar coordinate system. More particularly, the link 34 is constrained to translational movement in a single direction parallel to its long axis 88 relative to a carrier 190 through which the link 34 slides. The carrier 190 is shown in partly exploded view in FIG. 5. The carrier 190 is rotationally mounted to the surface of the computer housing 36 so that the carrier also rotates for defining an angular direction of link motion.

The carrier 190 includes a base 192 that is generally rectangular in plan view. A recess 194 is formed in the base 192 to extend completely through the length of the base. A hole 196 is formed near the outermost end (that is, to the right in FIG. 5) of the base 192 thereby to receive a projecting pivot post 198 that is fastened to the computer housing 36. The pivot post 198 secures the carrier base 192 to the housing while permitting rotation of the base 192 about the central axis 200 of the post 198.

The recess 194 in the carrier base 192 is constructed so that the link 34 fits within and slides freely lengthwise through the carrier. Preferably, the carrier is formed of low-friction material, such as a thermoplastic filled with polytetrafluoroethylene (PTFE).

Three adjacent, electrically conductive strips 77, 78, 79, comprising, for example, a graphite-filled polymer or other conductive material, are molded into the surface that comprises the bottom of the recess 194 of the carrier base 192. Each strip 77, 78, 79 extends along the substantial length of the recess 194 and terminates in a ribbon-type conductor 81 that is connected to the carrier base 192.

The conductive strips 77, 78, 79 are arranged on the carrier so that they each align with one of the conductive strips 62, 64, 66 that is carried on the underside of the link 34. When the link 34 is fit into the carrier recess 194, the strips 62, 64, 66 carried on the link and the conductive strips 77, 78, 79 on the carrier base are spaced apart by a distance of about 0.13 mm, thereby permitting capacitive coupling between the conductive strips on the link and the conductive strips on the carrier, as described more fully below.

The ribbon-type conductor 81 is connected to a top board 202 component of the carrier for conveying switch information for processing by the sensing system. As described in U.S. patent application Ser. No. 07/856,436, the top board 202 is a thin, flat member that is fastened to the carrier base 192 to substantially extend across and cover the recess 194 in which the link 34 slides. The top board 202 comprises a 0.35 mm thick polyimide sheet carrying conductive material to define a flexible, flat circuit. The components of the circuit for processing the switch information is described more fully below.

The top board 202 includes conductive patterns 208, 210 that move with rotation of the carrier 190 (hence, with rotation of the attached top board 202) relative to a stationary board 214 for sensing rotational motion of the carrier.

Figure 6:
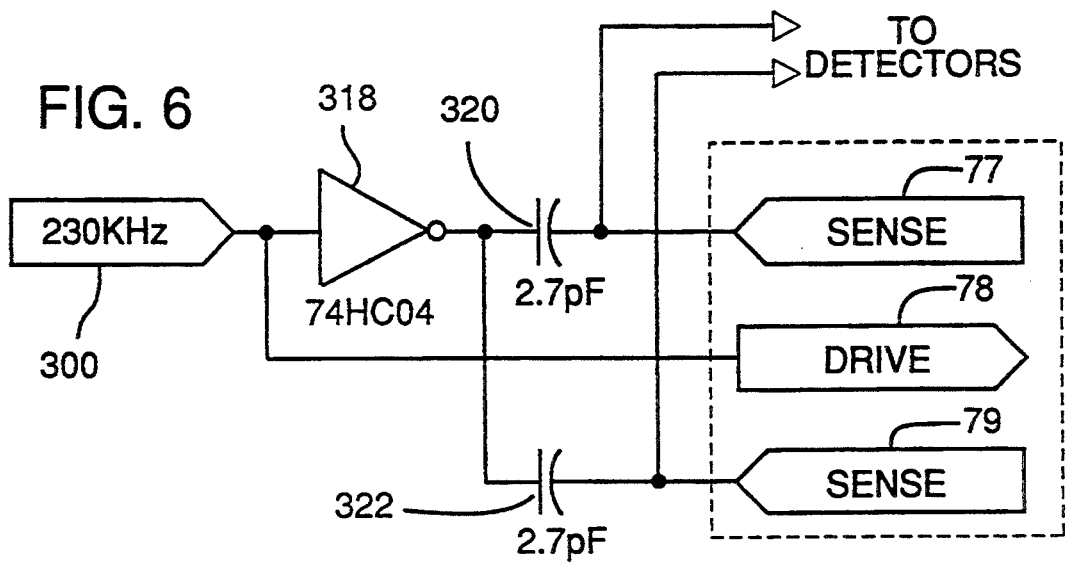
FIG. 6 is a schematic diagram of the drive circuit of the switch interconnect system, including components for stray capacitance compensation.
Figure 7:
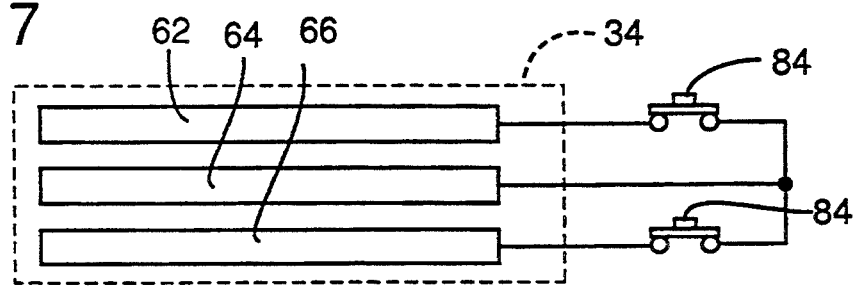
FIG. 7 is a schematic diagram of the conductors carried on the link for conveying switch state information.
Figure 8:
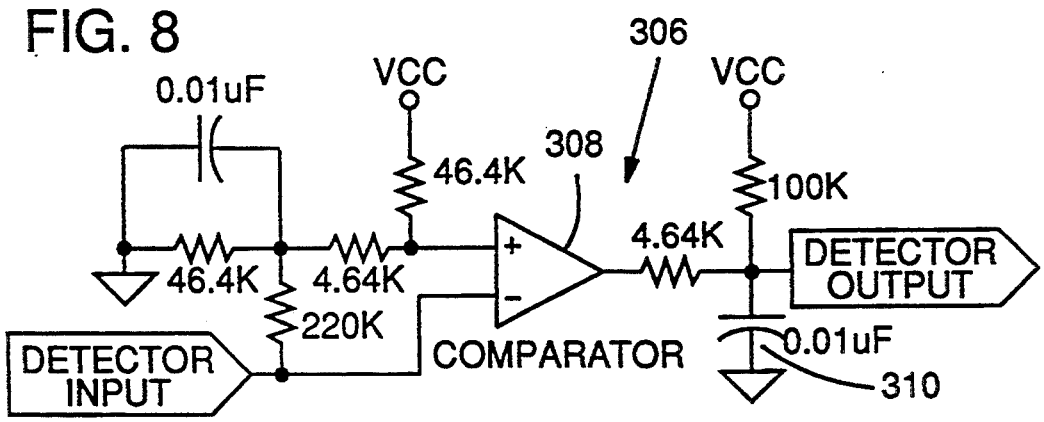
FIG. 8 is a schematic diagram of a detector circuit for detecting the switch state information.

The circuit components for processing switch state information are shown in FIGS. 6-8. In the preferred embodiment, the technique for capacitive coupling of switch state information consists of driving the center conductor 78 of the three carrier conductors 77, 78, 79 with a square-wave signal 300. The square-wave signal is a 230 kHz square-wave signal generated by a conventional CMOS logic gate. As shown in the schematic diagram of FIG. 6, the 230 kHz square-wave signal 300 is connected to the center (drive) conductive strip 78 on the carrier 190. As described above, the center conductive strip 78 is in close proximity to the center conductive strip 64 of the three conductive strips on the bottom surface of the link 34. Since these two conductive strips are in close proximity, the square-wave signal 300 is capacitively coupled to the center conductive strip 64 on the link.

As shown in the schematic diagram of FIG. 7, the center conductive strip 64 on the link is connected to the outer conductive strips 62 and 66 on the link through the two switches 84 carried on the handle 30. Normally, the switches 84 are open. In the open state, the switches do not conduct the square-wave signal 300 to the outer conductive strips 62, 66. However, when a switch is closed by the user pushing on the corresponding lever arm 98, 100, the square-wave signal is conducted along the path defined by the center strip 64 and the corresponding one of the outer conductive strips 62, 66.

The outer conductive strips 62 and 66 on the link are in close proximity to respective outer conductive strips 77 and 79 in the carrier 190. Therefore, when the square-wave signal received on the center link conductive strip 64 is conducted to one 62 of the outer conductive strips on the link by activation of an associated switch 84, the square-wave signal will be capacitively coupled to the corresponding one 77 of the (sense) conductive strips on the carrier 190.

Similarly, when the square-wave signal received on the center link conductive strip 64 is conducted to the other one 66 of the outer conductive strips on the link by activation of an associated switch 84, the square-wave signal will be capacitively coupled to the corresponding one 79 of the sense conductive strips on the carrier 190.

The conductive strips 77, 79 are connected to threshold level detectors. The threshold level detectors sense activation of a switch 84 by generating an output signal when an input signal from the sense conductive strips 77 or 79 exceeds a threshold level. A schematic diagram of a preferred threshold level detector 306 is shown in FIG. 8.

Each threshold detector 306 is implemented using a comparator 308 with an asymmetrical output. The output of the comparator may be either floating or actively driven low. An LM339 comparator is a typical part with this characteristic. When the square-wave signal is coupled to the detector by activation of the corresponding switch 84, the peaks of the signal received on the sense conductor 77 or 79 will exceed the threshold of the detector, driving the comparator output low. This discharges a capacitor 310 with a time constant of 46 μsec. The capacitor 310 recharges with a time constant of 1 msec. Therefore, when the threshold of the detector is exceeded, its output will go low over 20 cycles of the 230 kHz square-wave.

Referring again to FIG. 6, the switch information processing circuit also provides stray capacitance compensation. Due to stray capacitance between the center conductive strip 78 and the outer conductive strips 77 and 79, there may be some amount of capacitive coupling of the square-wave signal directly to the outer conductive strips and the threshold detectors even when the switches are not activated. The presence of such stray signals can cause difficulty in detecting switch activation. Therefore, stray capacitance compensation is provided so that the threshold detectors can more easily detect the presence or absence of the square-wave signals at the outer conductive strips 77, 79.

The effect of the stray capacitance is cancelled by coupling an inverter 318 and a compensating capacitor 320, 322 between the driven conductive strip 78 and the sense conductive strips 77, 79. The inverter 318 inverts the square-wave signal. The inverted square-wave signal is then applied to the input of each threshold detector through the compensating capacitors 320, 322. The compensating capacitors are chosen to approximately match the stray capacitance. However, the compensating capacitors need not match the stray capacitance exactly since the threshold detectors will ignore weak signals below their threshold level. Since the compensating capacitors need not be tuned to exactly match the stray capacitance, this technique is stable and manufacturable.

Having described and illustrated the principles of the invention with reference to a preferred embodiment, it will be recognized that the invention can be modified in arrangement and detail without departing from such principles. For example, numerous changes may be made to the construction of the preferred embodiment. The carrier and associated components may be mounted within the computer in a manner such that the carrier is inverted from the orientation described above and pivotally mounted to the underside of the main circuit board of the computer. Further, numerous variations in the fabrication of the link, including the conductive elements, could be substituted for those described above. Moreover, although the present invention is particularly applicable to interconnection of a pointing device with a computer, it is to be understood that the invention may be used in a wide variety of applications requiring interconnection of peripheral devices to computers. In view of the many possible embodiments to which the principles of the invention may be put, it should be recognized that the embodiment described herein is illustrative only and should not be taken as limiting the scope of the invention. Rather, the invention contemplates all such embodiments as may come within the scope and spirit of the following claims and equivalents thereto.

The invention claimed is:

1. A switch interconnect system, comprising
   a switch that is positionable between an open state and a closed state;
   a link having a first conductor portion and a second conductor portion and attached to the switch so that the first and second conductor portions are connected whenever the switch is in the closed state, and so that the first and second conductor portions are disconnected whenever the switch is in the open state;
   a base to which the link is mounted to move relative to the base, the base carrying a third conductor capacitively coupled to the first conductor portion, the base also carrying a fourth conductor that is capacitively coupled to the second conductor portion;
   drive means connected to the third conductor for applying a drive signal to the third conductor on the base; and
   detection means connected to the fourth conductor for detecting on the fourth conductor the presence of the drive signal capacitively coupled from the second conductor portion, whereby the presence of the signal in excess of a predetermined level is indicative of the switch being in the closed state.

2. The system of claim 1 further comprising compensation means for substantially cancelling drive signals received on the fourth conductor as a result of stray capacitive coupling between the third and fourth conductors.

3. The system of claim 2 wherein the compensation means includes an inverter and a compensating capacitor both interconnected between the drive means and the fourth conductor, the invertor inverting the drive signal, the compensating capacitor approximately matching the stray capacitance between the third and fourth conductors.

4. The system of claim 1 wherein the detection means includes a comparator having an input coupled with the fourth conductor and an asymmetrical output, and an output capacitor coupled to an output of the comparator, the comparator discharging the output capacitor with a first time constant when a signal on the fourth conductor exceeds a predetermined level, the output capacitor recharging with a second time constant.

5. A switch interconnect system, comprising
   a movable handle having a switch mounted thereto and the switch being positionable in a closed state and an opened state;
   a link connected to the handle for movement therewith;
   a carrier member, the link being mountable to the carrier member for movement relative to the carrier member; and
   coupling means carried by the link and carrier member for transmitting from the link to the carrier member by capacitive coupling a signal representing the state of the switch mounted on the handle.

6. The system of claim 5 wherein the carrier member has mounted thereto a first conductor and second conductor; and
   a signal generator connected to the first conductor to apply a drive signal to the first conductor and wherein the coupling means conducts the drive signal on the first conductor to the second conductor on the carrier member when the switch is in the closed state.

7. The system of claim 6 wherein the coupling means further includes a conductive path formed on the link and having portions of the path located adjacent to the first and second conductors on the carrier for capacitively coupling the conductive path on the link with the first and second conductors.

8. The system of claim 7 wherein the switch is arranged to interrupt the conductive path on the link whenever the switch is in an open state.

9. The system of claim 6 further including detection means for detecting the presence of the drive signal on the second conductor.

10. The system of claim 9 wherein the detection means includes compensation means for substantially eliminating effects on the detected drive signal that are attributable to stray capacitive coupling directly between the first and second conductors.

11. A method of obtaining switch status information from a switch device that includes a first conductor portion and a second conductor portion and that is operable for connecting the first conductor portion with the second conductor portion whenever the switch device is placed in a closed state, comprising the steps of:

mounting the switch device to a carrier member that has a first conductor and a second conductor attached to the carrier member so that the first conductor portion and second conductor portion move relative to the first and second conductors;

capacitively coupling the first conductor with the first conductor portion;

capacitively coupling the second conductor with the second conductor portion;

applying a drive signal to the first conductor; and detecting on the second conductor the presence of the drive signal that is transmitted between the first conductor portion and the second conductor portion whenever the switch is in the closed state.

12. The method of claim 11 further including the step of cancelling the drive signal received on the second conductor as a result of stray capacitive coupling directly between the first and second conductors.

* * * * *